United States Patent
Corral et al.

(10) Patent No.: US 11,760,362 B2
(45) Date of Patent: Sep. 19, 2023

(54) POSITIVE AND NEGATIVE REINFORCEMENT SYSTEMS AND METHODS OF VEHICLES FOR DRIVING

(71) Applicant: Veoneer US LLC, Southfield, MI (US)

(72) Inventors: Christopher Corral, Mesa, AZ (US); Caroline Chung, Royal Oak, MI (US); Alexandru Orban, Lugoj (RO); Trinten Patten, Clio, MI (US)

(73) Assignee: VEONEER US, LLC, Southfield, MI (US)

( * ) Notice: Subject to any disclaimer, the term of this patent is extended or adjusted under 35 U.S.C. 154(b) by 80 days.

(21) Appl. No.: 17/556,184

(22) Filed: Dec. 20, 2021

(65) Prior Publication Data
US 2023/0192098 A1 Jun. 22, 2023

(51) Int. Cl.
*H04N 5/44* (2011.01)
*B60W 40/09* (2012.01)
*B60W 50/14* (2020.01)
*B60R 22/48* (2006.01)
*B60W 40/08* (2012.01)

(52) U.S. Cl.
CPC ............ *B60W 40/09* (2013.01); *B60R 22/48* (2013.01); *B60W 50/14* (2013.01); *B60R 2022/4808* (2013.01); *B60W 2040/0863* (2013.01); *B60W 2040/0881* (2013.01); *B60W 2050/146* (2013.01)

(58) Field of Classification Search
CPC ............... B60W 40/09; B60W 50/14; B60W 2040/0863; B60W 2040/0881; B60W 2050/146; B60R 22/48; B60R 2022/4808
See application file for complete search history.

(56) References Cited

U.S. PATENT DOCUMENTS

| | | | |
|---|---|---|---|
| 9,373,203 B1* | 6/2016 | Fields | H04W 4/029 |
| 9,586,591 B1* | 3/2017 | Fields | G09B 5/00 |
| 11,302,209 B2* | 4/2022 | Skagius | G07C 5/06 |
| 2014/0046701 A1* | 2/2014 | Steinberg | B60W 40/10 705/4 |
| 2015/0062168 A1* | 3/2015 | Ng-Thow-Hing | G02B 27/0101 345/633 |
| 2016/0267335 A1* | 9/2016 | Hampiholi | B60K 28/06 |
| 2018/0118219 A1* | 5/2018 | Hiei | B60W 40/09 |
| 2021/0206382 A1* | 7/2021 | Nakada | G06N 20/00 |
| 2022/0291888 A1* | 9/2022 | Kamezaki | B60K 37/06 |
| 2022/0410908 A1* | 12/2022 | Molin | B60W 40/09 |

* cited by examiner

*Primary Examiner* — Munear T Akki (57) ABSTRACT

A system includes: a first camera configured to capture first images of a driver on a driver's seat within a passenger cabin of the vehicle; a second camera configured to capture second images in front of the vehicle; a driver module configured to determine a driver and a present rank of the driver; a module configured to detect a condition based on at least one of (a) a first image, (b) a second image, and (c) a parameter measured by a sensor; a reinforcement module configured to: display the present rank within the passenger cabin; generate an output within the passenger cabin in response to the detection of the condition; when no conditions are detected, increment a rank period of the driver; selectively increase the present rank of the driver; and generate an alert within the passenger cabin in response to the increasing of the present rank.

20 Claims, 7 Drawing Sheets

POSITIVE AND NEGATIVE REINFORCEMENT SYSTEMS AND METHODS OF VEHICLES FOR DRIVING

FIELD

The present disclosure relates to vehicle systems and methods and more particularly to systems and methods for providing positive and negative behavior reinforcement for a driver of a vehicle.

BACKGROUND

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

Driver monitoring systems of vehicles include a camera that faces the driver of a vehicle. Images from the camera are used during driving to monitor for alertness of the driver. Driver monitoring systems may also determine how actively the driver is paying attention to the environment in front of the vehicle.

The camera may be, for example, mounted on a steering wheel of the vehicle or in another suitable location. Images from the camera may be used to monitor driver fatigue. When fatigue or a lack of attention of the driver is detected, the driver may be alerted.

SUMMARY

In a feature, a behavior reinforcement system of a vehicle includes: a first camera configured to capture first images of a driver on a driver's seat within a passenger cabin of the vehicle; a second camera configured to capture second images in front of the vehicle; a driver module configured to determine a driver of the vehicle based on at least one of the first images and to determine a present rank of the driver; a module configured to detect a negative reinforcement condition based on at least one of (a) a first image from the first camera, (b) a second image from the second camera, and (c) a parameter measured by a sensor of the vehicle; a reinforcement module configured to: display the present rank of the driver within the passenger cabin; generate at least one of an audible, visual, and haptic output within the passenger cabin in response to the detection of the negative reinforcement condition; when no negative reinforcement conditions are detected, increment a rank period of the driver; increase the present rank of the driver when the rank period is greater than a predetermined period; and generate at least one of an audible alert and a visual alert within the passenger cabin in response to the increasing of the present rank.

In further features, the negative reinforcement condition includes the driver not wearing a seatbelt property.

In further features, a propulsion control module is configured to one of shift a transmission to park and to maintain a transmission in park in response to the module detecting that the driver is not wearing the seatbelt property.

In further features, the module is configured to determine whether the driver is property wearing the seatbelt based on input from a seatbelt sensor of the vehicle and a first image from the first camera.

In further features, the negative reinforcement condition includes a gaze of the driver not being within a predetermined area.

In further features, the module is configured to determine whether the gaze of the driver is within the predetermine area based on a first image from the first camera.

In further features, the negative reinforcement condition is aggressive driving.

In further features, the module is configured to determine whether aggressive driving is occurring based on at least one of (a) a brake pedal position measured by a brake pedal position sensor and (b) an acceleration of the vehicle measured by an acceleration sensor.

In further features, the negative reinforcement condition is changing a present lane of the vehicle without using a turn signal property.

In further features, the module is configured to determine whether the changing of the present lane of the vehicle without using a turn signal property occurred based on the second image from the second camera and a turn signal from a turn signal sensor of the vehicle.

In further features, the negative reinforcement condition is a distance between the vehicle and an object in front of the vehicle being less than a predetermined distance.

In further features, the module is configured to determine the distance between the vehicle and the object based on a second image from the second camera.

In further features, the module is configured to set the predetermined distance based on a present speed of the vehicle.

In further features, the module is configured to increase the predetermined distance as the present speed of the vehicle increases.

In further features, the negative reinforcement condition is a present speed of the vehicle being greater than a speed limit of a road at a present location of the vehicle.

In further features, the module is configured to determine the speed limit of the road at the present location of the vehicle based on a second image from the second camera.

In further features, the reinforcement module is configured to display a badge associated with the present rank of the driver within the passenger cabin.

In further features, the reinforcement module is configured to display the present rank of the driver via at least one of (a) a heads up display system of the vehicle and (b) a display visible within the passenger cabin of the vehicle.

In further features, the reinforcement module is configured to increment the present rank of the driver by one when the rank period is greater than the predetermined period.

In a feature, a behavior reinforcement method for a vehicle includes: using a first camera, capturing first images of a driver on a driver's seat within a passenger cabin of the vehicle; using a second camera, capturing second images in front of the vehicle; determining a driver of the vehicle based on at least one of the first images and to determine a present rank of the driver; detecting a negative reinforcement condition based on at least one of (a) a first image from the first camera, (b) a second image from the second camera, and (c) a parameter measured by a sensor of the vehicle; displaying the present rank of the driver within the passenger cabin; generating at least one of an audible, visual, and haptic output within the passenger cabin in response to the detection of the negative reinforcement condition; when no negative reinforcement conditions are detected, incrementing a rank period of the driver; increasing the present rank of the driver when the rank period is greater than a predetermined period; and generating at least one of an audible alert and a visual alert within the passenger cabin in response to the increasing of the present rank.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Images from a passenger cabin camera of a vehicle may be used to detect objects and conditions within the passenger cabin, such as a gaze of a driver, a number of passengers, mobile electronic device usage, etc. Images from a forward facing camera of a vehicle may be used to detect objects and conditions and the road in front of the vehicle, such as lane boundaries, vehicles, pedestrians, etc.

One or more negative reinforcement actions may be taken when a driver makes one or more driving maneuvers. For example, an alert (e.g., visible, audible, and/or haptic) may be output when the driver changes lanes without property signaling a lane change or when the gaze of the driver is not in front of the vehicle (e.g., within a predetermined area).

The present application involves providing both negative reinforcements for poor driving and positive reinforcements for good driving and vehicle operation. For example, increasing ranks/badges may be provided and output to the driver as good driving occurs. The positive reinforcements may encourage the driver to continue with good driving habits and avoid poor driving habits.

Figure 1:
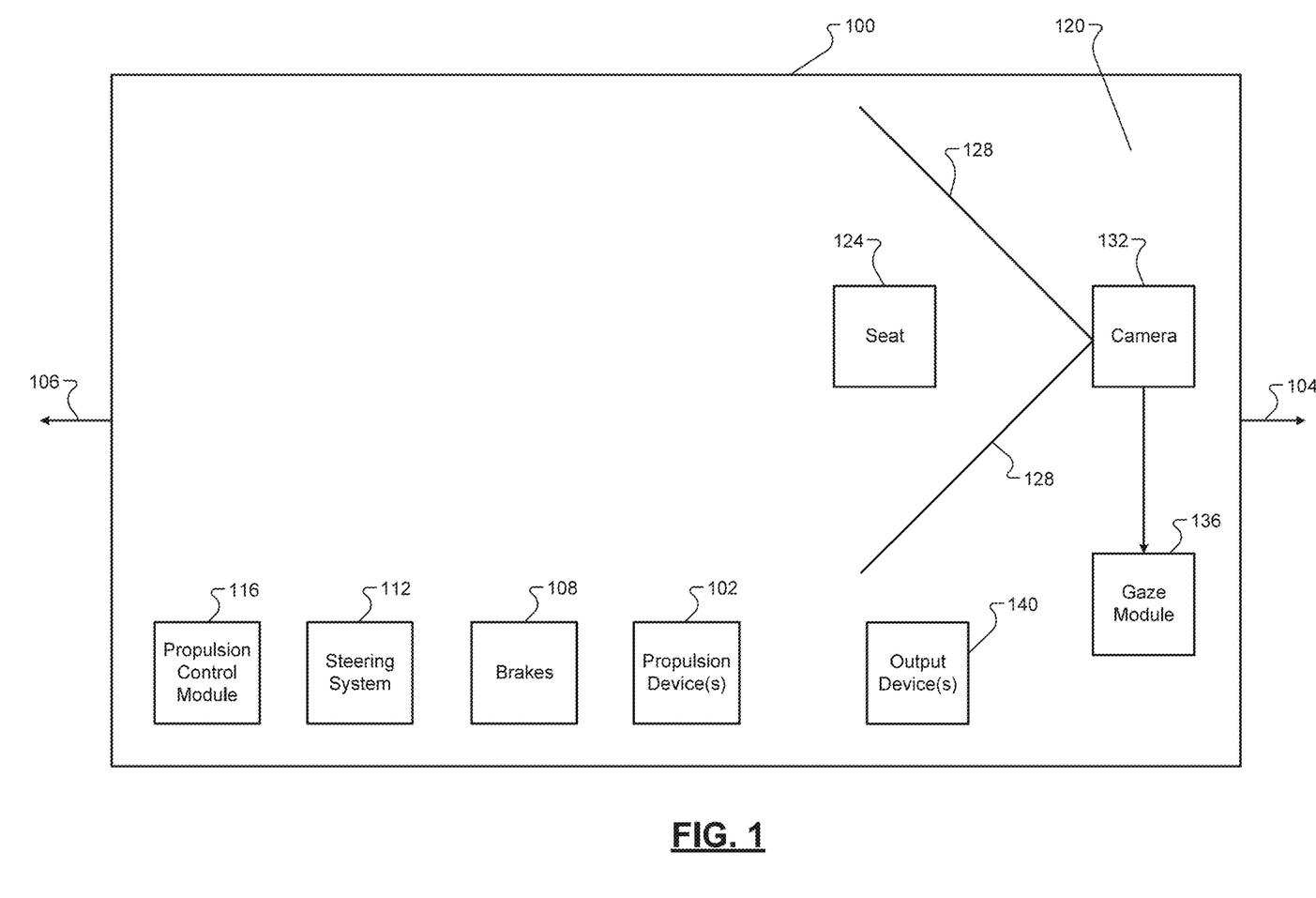
FIG. 1 is a functional block diagram of an example implementation of a vehicle.

FIG. 1 is a functional block diagram of an example vehicle 100 including one or more propulsion devices. The vehicle 100 may be a vehicle including an internal combustion engine, an electric vehicle including one or more electric motors not including an internal combustion engine, a hybrid vehicle including an electric motor and an internal combustion engine, or another suitable type of vehicle. The vehicle 100 may be an autonomous vehicle, a non-autonomous vehicle, or a semiautonomous vehicle. The vehicle 100 may be a ride share vehicle or may be a non-shared vehicle.

The vehicle 100 includes one or more propulsion devices 102, such as at least one of an electric motor and an internal combustion engine, that generate propulsion torque that is used to propel the vehicle 100. Forward and backward directions of the vehicle 100 are illustrated by arrows 104 and 106. The vehicle 100 includes mechanical (friction) brakes 108 that decelerate the vehicle 100 when actuated. The vehicle 100 includes a steering system 112 that steers the vehicle 100 when actuated. The steering system 112 may be, for example, an electric power steering system or another suitable type of steering system.

A propulsion control module 116 controls the steering system 112, the brakes 108, and the propulsion device(s) 102. The propulsion control module 116 may control positive torque output from the propulsion device(s) 102 based on at least one of (a) an accelerator pedal position and (b) autonomous or semiautonomous driving input. The propulsion control module 116 may control actuation of the brakes 108 based on at least one of (a) a brake pedal position and (b) autonomous or semiautonomous driving input. The propulsion control module 116 may control actuation of the steering system 112 based on at least one of (a) a steering wheel angle and (b) autonomous or semiautonomous driving input. For example, the propulsion control module 116 may actuate the steering system 112 to maintain the vehicle 100 between lane lines of a present lane.

The vehicle 100 includes a passenger cabin 120. A driver's seat 124 is disposed within the passenger cabin 120. While only the driver's seat 124 is shown for simplicity, one or more additional seats may also be disposed within the passenger cabin 120.

The driver's seat 124 is disposed within a field of view (FOV) 128 of a passenger cabin camera 132. One, more than one, or all of the other seats of the vehicle may also be within the FOV of the camera 132 or another passenger cabin camera. While an example horizontal FOV is shown, the FOV 128 may be greater than or lesser than the example FOV shown. Because the driver's seat 124 is disposed within the FOV 128, a portion of a driver (e.g., an upper torso and head of the driver) sitting on the driver's seat 124 is captured in images captured by the camera 132.

A gaze module 136 identifies eyes of the driver and pupils of the eyes, respectively. The gaze module 136 determines a gaze indicative of a direction of the pupils of the driver based on the position of the camera 132 and the direction of the pupils. The gaze is used to determine whether the driver is looking within a driver monitoring system (DMS) area while the vehicle is moving in the forward direction. The DMS area is an area on a vertical plane in front of the vehicle 100.

Figure 2:
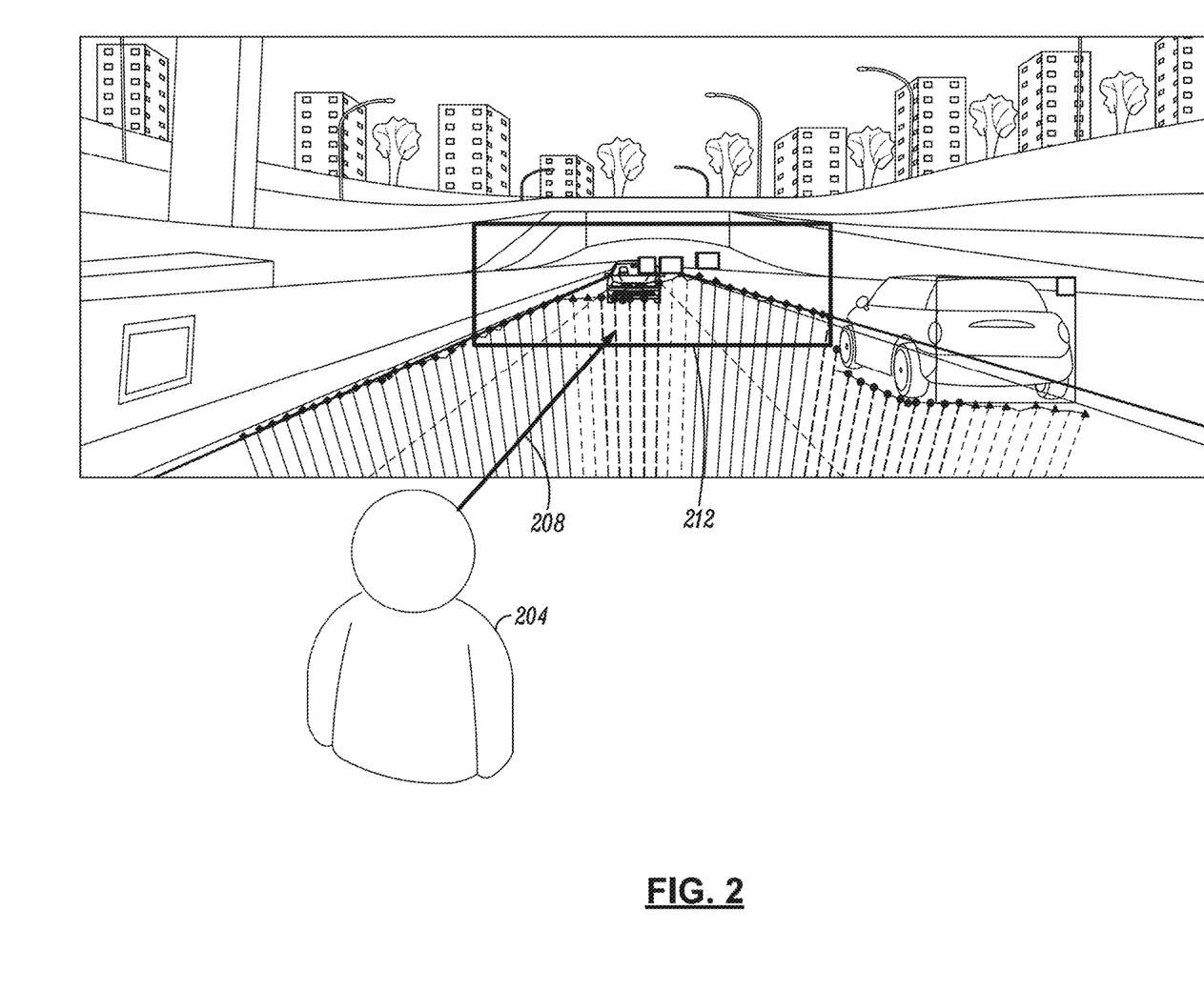
FIG. 2 includes an example illustration of a driver and a gaze of the driver and a driver monitoring system area.

FIG. 2 includes an example illustration of a driver 204 and a gaze 208 determined by the gaze module 136 based on the direction of pupils of eyes, respectively, of the driver 204. An example DMS area 212 is illustrated. In the example of FIG. 2, the gaze vector 208 intersects the DMS area 212. The gaze of the driver 204 is therefore within the DMS area 212. The gaze of the driver 204 being outside of the DMS area may indicate that the driver is not monitoring the road in front of the vehicle.

One or more actions may be taken when the gaze of the driver 204 is outside of the DMS area for a first predetermined period. For example, one or more outputs may be generated by one or more output devices 140 (FIG. 1). For example, one or more visual outputs may be visually output via one or more visual output devices (e.g., displays, lights, indicators, etc.). Additionally or alternatively, one or more audible outputs may be audibly output via one or more speakers. Additionally or alternatively, the one or more haptic outputs may be output via one or more vibrating devices (e.g., in steering wheel, in seat, etc.). When the gaze of the driver is outside of the DMS area for a second predetermined period, one or more additional actions may be taken. For example, the propulsion control module 116 may at least one of decrease torque output of the propulsion device(s) 102, apply the brakes 108, and adjust the steering (e.g., to move the vehicle to a shoulder).

The DMS area could be a fixed predetermined area or a variable area on a vertical plane that is N units of distance (e.g., meters or feet) in front of (more forward than) the vehicle (e.g., the windshield). N may be an integer greater than or equal to zero.

Figure 3:
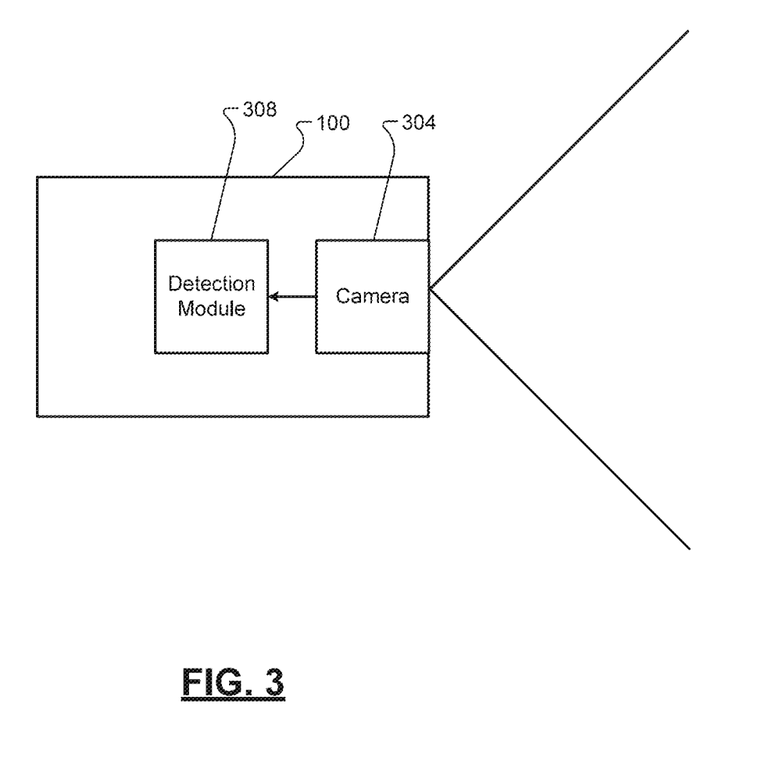
FIG. 3 is a functional block diagram of a portion of a vehicle.

FIG. 3 is a functional block diagram of a portion of the vehicle 100. The vehicle 100 includes one or more forward facing cameras, such as forward facing camera 304. Forward facing cameras may be disposed, for example, behind a rearview mirror of the vehicle, on a front fascia of the vehicle, above a windshield of the vehicle, and/or in other suitable forward facing locations. While an example FOV of the camera 304 is shown, the FOV in front of the vehicle 100 may be greater than or lesser than the example FOV shown.

A (first) detection module 308 receives the images of in front of the vehicle 100 and identifies boundaries of a road in front of the vehicle 100. The detection module 308 may, for example, identify boundaries of the road using an object (e.g., line) detection algorithm. For example, the detection module 308 may identify points on the left and right boundaries of the road in the images and connect the points to determine the left and right boundaries of the road. The detection module 308 may fit an equation to the points on the left boundary and fit an equation to the points of the right boundary of the road using a line fitting algorithm. The detection module 308 may also detect other objects and conditions in front of the vehicle using images from the camera 304, images from one or more other cameras 304, and/or parameters from one or more other sensors of the vehicle and/or date sources.

Figure 4:
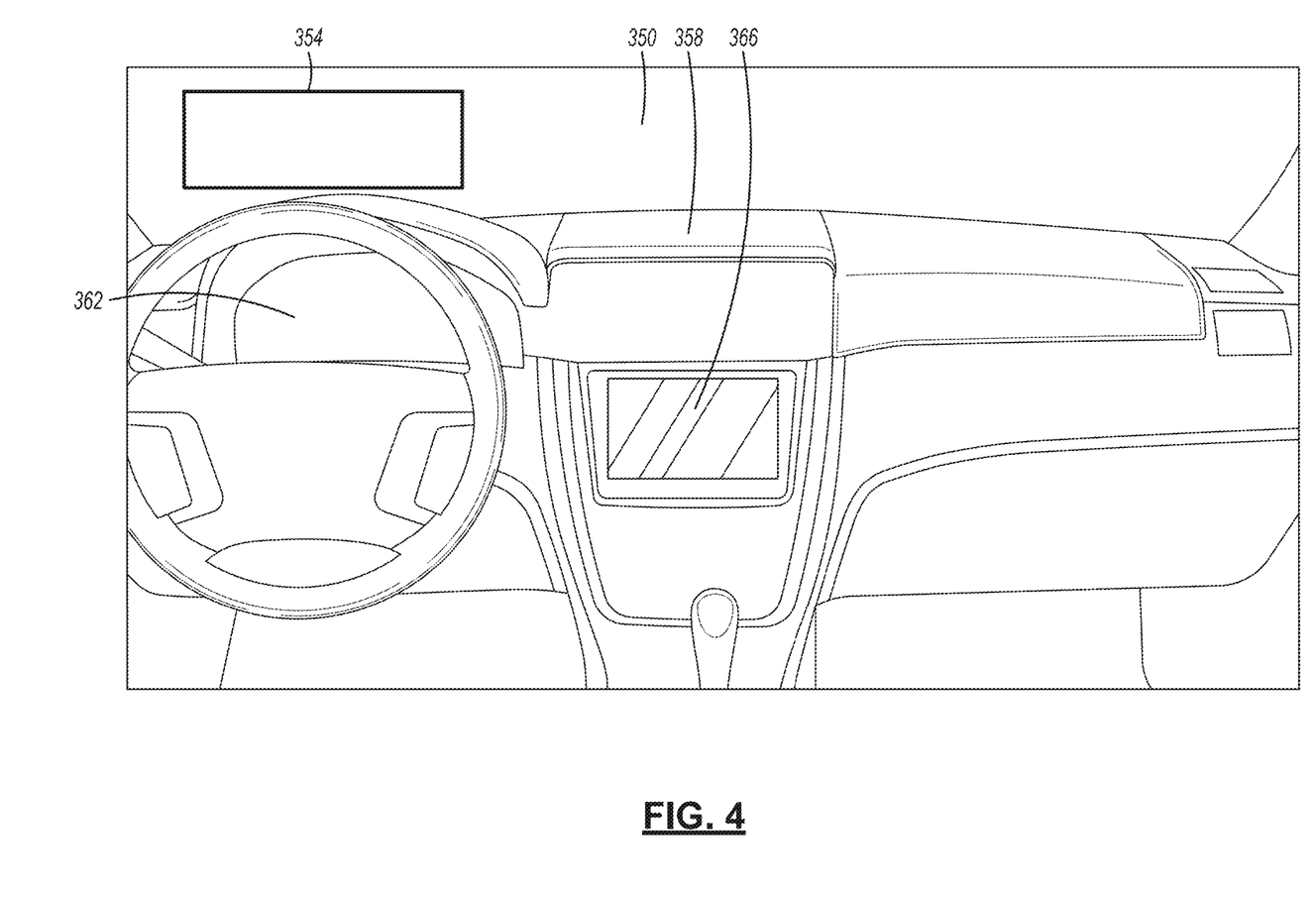
FIG. 4 is an example view from within the passenger cabin of the vehicle.

FIG. 4 is an example view from within the passenger cabin 120 of the vehicle 100. While an example illustration is provided, the present application is also applicable to other passenger cabin arrangements.

The vehicle 100 includes a heads up display (HUD) system that projects information onto a front windshield 350 and to the driver via the front windshield 350. An example illustration of an area 354 where the HUD system projects information is shown in FIG. 4. The present application, however, is applicable to other areas and sizes for the display of information by the HUD system. The HUD system outputs light to the front windshield 350 via an aperture in a dashboard 358 of the vehicle 100. The HUD system is disposed below the dashboard 358.

The vehicle 100 also includes one or more other displays. For example, the vehicle 100 includes a cluster 362 that displays information to the driver, such as vehicle speed, one or more temperatures, etc. The cluster 362 may include a display that displays the information. The vehicle 100 may also include an infotainment system display 366 (e.g., a touchscreen display) that displays information, such as audio information, mapping information, and other information. Positive and negative reinforcements for driving behavior may be displayed via one, more than one, or all of the displays of the vehicle 100, such as discussed further below.

Figure 5:
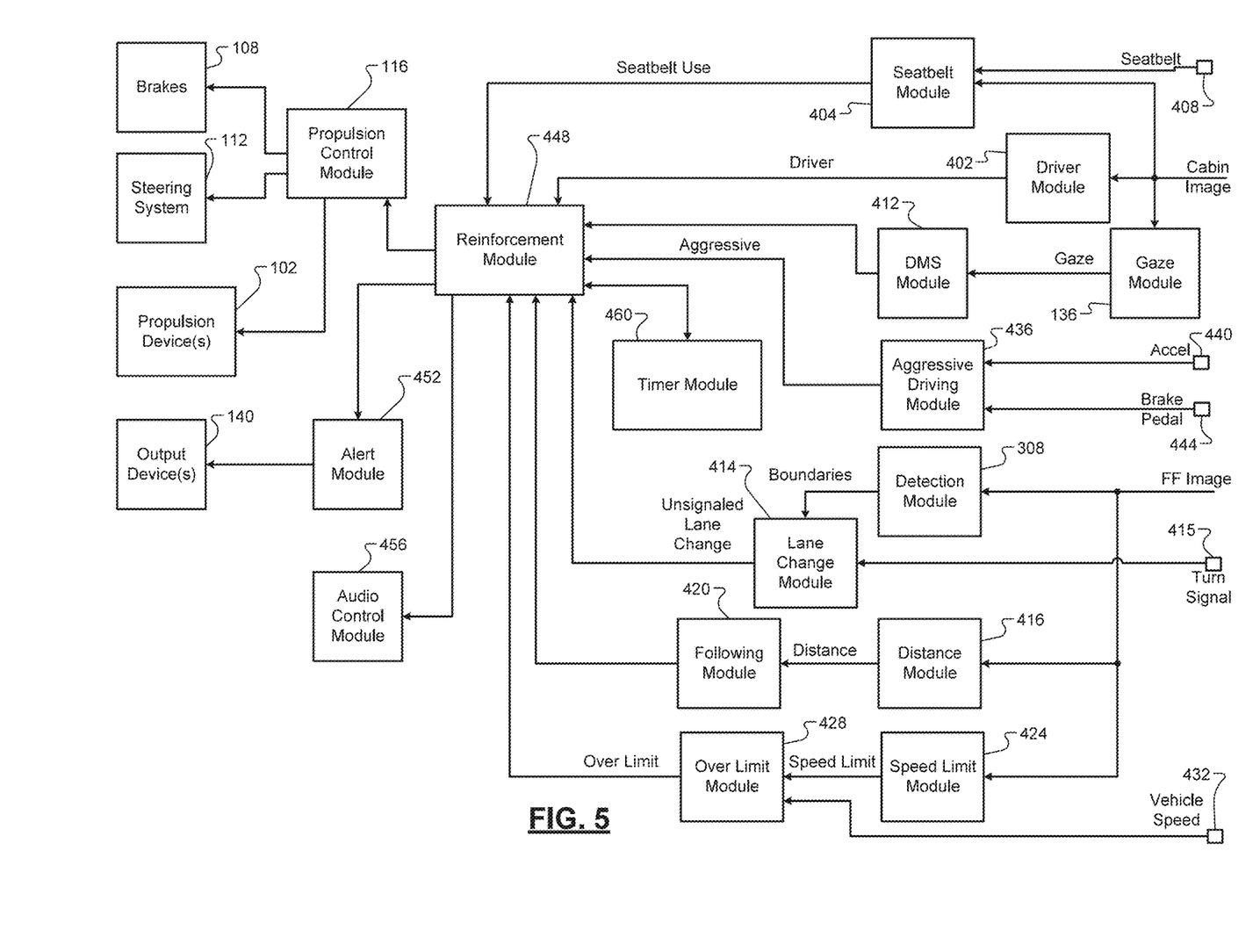
FIG. 5 is a functional block diagram of an example behavior reinforcement system of the vehicle.

FIG. 5 is a functional block diagram of an example behavior reinforcement system of the vehicle 100. As discussed above, the gaze module 136 determines the (present) gaze of the driver based on the direction of the pupils of the driver in images (cabin images) captured by the camera 132.

The cameras 132 and 304 may capture images at a predetermined rate, such as 60 hertz or another suitable rate.

A driver module 402 determines a present driver of the vehicle based on images from the camera 132. For example, drivers of the vehicle may position their faces within the FOV of the camera 132 and move in a predetermined pattern to initially capture facial recognition profiles for the drivers, respectively. The driver module 402 can therefore later identify the present driver of the vehicle using facial recognition and images from the camera 132 by matching to stored facial recognition profiles. Facial recognition profiles of drivers are stored in driver profiles, respectively, in memory.

Each driver profile may also include a present rank and a rank period for the associated driver. The rank and the rank period may be used to provide positive reinforcement for the driver, such as discussed further below.

One or more conditions and/or objects may additionally be detected based on images from the camera 132. For example, a seatbelt module 404 may determine whether the driver is properly wearing the seatbelt of the driver's seat. The seatbelt module 404 may determine whether the seatbelt is properly routed, for example, based on one or more images from the camera 132. The seatbelt module 404 may determine whether the seatbelt is properly fastened, for example, based on a signal from a seatbelt sensor 408 of the driver's seat that indicates whether the seatbelt of the driver's seat is fastened or not. The seatbelt module 404 may determine that the driver is properly wearing the seatbelt of the driver's seat when the seatbelt is properly routed and fastened.

A driver monitoring system (DMS) module 412 determines whether the location where the gaze of the driver intersects the vertical plane of the DMS area is within the DMS area. The DMS module 412 generates a signal that indicates whether the gaze of the driver is within the DMS area or outside of the DMS area.

The detection module 308 determines the boundaries of the road in front of the vehicle 100 based on images (forward facing (FF) images) from the camera 304, such as described above.

A lane change module 414 determines and indicates whether the driver performed a lane change without using the proper turn signal. For example, the lane change module 414 determines whether the vehicle 100 moved from one lane into another lane based on the boundaries detected by the detection module 308. The lane change module 414 may determine that a lane change occurred when one of the boundaries transitions from being on one side (e.g., left or right) of the vehicle 100 to being on the other side (e.g., left or right) of the vehicle 100. The lane change module 414 determines whether the proper turn signal was used based on a turn signal that indicates left, right, or no turn signal use. The turn signal may be generated by a turn signal sensor 415. The lane change module 414 may determine that an improper lane change occurred when a leftward lane change is detected based on the road boundaries and either no turn signal or the right turn signal was used. The lane change module 414 may determine that an improper lane change occurred when a rightward lane change is detected based on the road boundaries and either no turn signal or the left turn signal was used.

The lane change module 414 may determine that a proper lane change occurred when a leftward lane change is detected based on the road boundaries and the left turn signal was used. The lane change module 414 may determine that a proper lane change occurred when a rightward lane change is detected based on the road boundaries and the right turn signal was used.

One or more other objects and/or conditions in front of the vehicle 100 may additionally be detected based on the images from the camera 304. For example, a distance module 416 may detect an object (e.g., a vehicle) in front of the vehicle 100 and determine a distance between the object and the vehicle 100. This distance may be referred to as a following distance in the example of the object being a vehicle. A distance module 416 may detect vehicles using object detection.

A following module 420 may determine and indicate whether the distance between the vehicle 100 and the object is less than a predetermined distance. The following module 420 may set the predetermined distance based on the vehicle speed. For example, the following module 420 may increase the predetermined distance as the vehicle speed increases and vice versa. The distance between the vehicle 100 and the object being less than the predetermined distance may indicate that the vehicle 100 may not be able to stop before colliding with the object.

A speed limit module 424 may detect a present speed limit at the location of the vehicle 100, such as based on an image captured by the camera 304. The speed limit module 424 may, for example, detect a speed limit sign in an image captured by the camera 304 and read the speed limit from the sign, such as using optical character recognition (OCR). In various implementations, a global positioning system (GPS) module may determine a present location of the vehicle 100 using signals from satellites of a GPS. The GPS module may determine a heading of the vehicle 100 based on a change in the present location relative to a previous location of the vehicle 100. The speed limit module 424 may determine the present speed limit at the location of the vehicle based on the present location and heading of the vehicle 100 using a database of speed limits indexed by locations and headings. In various implementations, the speed limit module 424 may receive the present location and heading of the vehicle 100 from a mobile device (e.g., a cellular phone) connected to the vehicle 100, such as via a Universal Serial Bus (USB) port.

An over limit module 428 determines and indicates whether a present speed of the vehicle 100 (vehicle speed) is greater than the speed limit at the location of the vehicle 100. In various implementations, the over limit module 428 may determine and indicate whether the present vehicle speed is greater than the speed limit by at least a predetermined amount. The predetermined amount may be calibrated and may be, for example, 7 miles per hour or another suitable amount. In various implementations, the predetermined amount may be zero. The vehicle speed may be measured using one or more sensors 432 (e.g., wheel speed sensors) of the vehicle or determined, such as based on movement of one or more objects in images captured using the camera 304, GPS data, or in another suitable manner. In the example of wheel speeds, the vehicle speed may be set based on an average of two or more wheel speeds measured by wheel speed sensors, respectively.

One or more other conditions may be detected based on measurements from sensors of the vehicle 100. For example, an aggressive driving module 436 may determine and indicate whether aggressive driving is being performed based on measurements from one or more sensors, such as at least one of an acceleration from an acceleration (lateral or longitudinal) sensor 440 and a brake pedal position from a brake pedal position sensor 444. The aggressive driving module 36 may indicate that aggressive driving is being performed, for example, when at least one of a rate of increase of the brake pedal position is greater than a predetermined rate of increase and the acceleration (or deceleration) is greater than a predetermined acceleration (or deceleration). The predetermined rate of increase and the predetermined acceleration (or deceleration) may be calibratable and may be set to, for example, 30 percent brake pedal position per 0.5 seconds and 3 meters per second (m/s) acceleration or deceleration.

A reinforcement module 448 provides positive and negative reinforcement for good and bad driving conditions, respectively. The reinforcements may include visual, audible, and/or haptic outputs, adjustments to one or more operating parameters or systems of the vehicle 100, and other suitable reinforcements.

For example, the reinforcement module 448 may prompt an alert module 452 to output at least one of an audible, visual, and haptic alert via at least one of the output devices 140 when (1) the DMS module 412 indicates that the gaze of the driver is outside of the DMS area for the first predetermined period. The output devices 140 may include the HUD system, the cluster 362, the display 366, one or more speakers, one or more vibrating devices, and/or one or more other suitable output devices of the vehicle 100. The output may be a negative reinforcement to encourage the driver to stop looking away from the road. Additionally, the reinforcement module 448 may prompt an audio control module 456 to prevent the driver from making changes to an audio system of the vehicle 100. For example, in response to the prompt, the audio control module 456 may not allow the driver to change a station (e.g., channel, station, frequency, etc.), change the volume, and/or adjust one or more other parameters of the audio system. In various implementations, the audio control module 456 may turn off audio of the audio system in response to the prompt. This may encourage the driver to stop looking away from the road by eliminating a possible distraction.

As another example, the reinforcement module 448 may prompt the alert module 452 to output at least one of an audible, visual, and haptic alert via at least one of the output devices 140 when (2) the aggressive driving module 436 indicates that aggressive driving is occurring. The output may be a negative reinforcement to encourage the driver to stop driving aggressively. Additionally, the reinforcement module 448 may prompt the propulsion control module 116 to limit acceleration in response to the prompt from the reinforcement module. For example, in response to the prompt, the propulsion control module 116 may control the propulsion devices 102 based on limiting acceleration of the vehicle 100 to a predetermined maximum acceleration. The predetermined maximum acceleration may be calibrated and may be, for example, 3 m/s or another suitable acceleration.

As another example, the reinforcement module 448 may prompt the alert module 452 to output at least one of an audible, visual, and haptic alert via at least one of the output devices 140 when (2) the aggressive driving module 436 indicates that aggressive driving is occurring. The output may be a negative reinforcement to encourage the driver to stop driving aggressively. Additionally, the reinforcement module 448 may prompt the propulsion control module 116 to limit acceleration in response to the prompt from the reinforcement module. For example, in response to the prompt, the propulsion control module 116 may control the propulsion devices 102 based on limiting acceleration of the vehicle 100 to a predetermined maximum acceleration. The predetermined maximum acceleration As another example, the reinforcement module 448 may prompt the alert module 452 to output at least one of an audible, visual, and haptic alert via at least one of the output devices 140 when (3) the lane change module 414 indicates that the driver performed a lane change without using the proper turn signal. The output may be a negative reinforcement to encourage the driver to properly use turn signals. Additionally, the reinforcement module 448 may enable (if disabled) a lane keep assist module of the propulsion control module 116 and not allow the lane keep assist module to be disabled in response to user input, such as by the driver. When enabled, the lane keep assist module controls the steering system 112 to maintain the vehicle 100 between the boundaries of the road and to prevent the vehicle 100 from crossing a boundary unless the proper turn signal is used.

As another example, the reinforcement module 448 may prompt the alert module 452 to output at least one of an audible, visual, and haptic alert via at least one of the output devices 140 when (4) the following module 420 indicates that the following distance is less than the predetermined distance. The output may be a negative reinforcement to encourage the driver to increase the following distance. Additionally, the reinforcement module 448 may enable (if disabled) an adaptive cruise control module of the propulsion control module 116 and not allow the lane adaptive cruise control module to be disabled in response to user input, such as by the driver. When enabled, the adaptive cruise control module controls at least one of the propulsion devices 102 and the brakes 108 to maintain the following distance greater than or equal to the predetermined distance.

As another example, the reinforcement module 448 may prompt the alert module 452 to output at least one of an audible, visual, and haptic alert via at least one of the output devices 140 when (5) the over limit module 428 indicates that the vehicle speed is greater than the predetermined speed limit at the location of the vehicle 100. The output may be a negative reinforcement to encourage the driver to drive more slowly. Additionally, the reinforcement module 448 may enable (if disabled) the adaptive cruise control module of the propulsion control module 116 and not allow the lane adaptive cruise control module to be disabled in response to user input, such as by the driver. When enabled, the adaptive cruise control module controls at least one of the propulsion devices 102 and the brakes 108 to maintain the vehicle speed less than or equal to the speed limit or the speed limit plus the predetermined amount.

As another example, the reinforcement module 448 may prompt the alert module 452 to output at least one of an audible, visual, and haptic alert via at least one of the output devices 140 when (6) the seatbelt module 404 indicates that the driver is not property wearing his or her seatbelt. The output may be a negative reinforcement to encourage the driver to property wear a seatbelt. Additionally, the reinforcement module 448 may prompt the propulsion control module 116 to not allow a transmission of the vehicle 100 to be shifted out of park or to control at least one of the propulsion devices 102 and the brakes 108 to limit the vehicle speed to a maximum of a predetermined no seatbelt speed. The predetermined no seatbelt speed may be calibratable and may be, for example, 10 miles per hour or another suitable speed.

While the examples of (1)-(6) are provided, the present application is also applicable to other driving conditions when one or more negative reinforcements may be provided. When none of (1)-(6) (and no other driving conditions for providing negative reinforcements) are present, the reinforcement module 448 may increment the rank period for the driver. The rank period may be tracked by a timer module 460. The rank period may track the total (cumulative) period that (1)-(6) and any other driving conditions for providing negative reinforcements are not present. The reinforcement module 448 may check whether (1)-(6) and any other driving conditions for providing negative reinforcements are present every predetermined period (e.g., 1 second or another suitable period) and increment the timer by the predetermined period (e.g., 1 second) when none of (1)-(6) and any other driving conditions for providing negative reinforcements are present.

The reinforcement module 448 determines the rank of the driver based on the rank period. For example, the reinforcement module 448 may set the rank of the driver to a first rank when the rank period is between 0 and a first predetermined rank period. The first predetermined rank period may be calibratable and may be, for example, approximately 3 hours or another suitable period.

The reinforcement module 448 may set the rank of the driver to a second rank that is higher than the first rank when the rank period is between the first predetermined rank period and a second predetermined rank period. The second predetermined rank period is greater than the first predetermined rank period, may be calibratable, and may be, for example, approximately 6 hours or another suitable period.

The reinforcement module 448 may set the rank of the driver to a third rank that is higher than the second rank when the rank period is between the second predetermined rank period and a third predetermined rank period. The third predetermined rank period is greater than the second predetermined rank period, may be calibratable, and may be, for example, approximately 12 hours or another suitable period.

The reinforcement module 448 may set the rank of the driver to a fourth rank that is higher than the third rank when the rank period is between the third predetermined rank period and a fourth predetermined rank period. The fourth predetermined rank period is greater than the third predetermined rank period, may be calibratable, and may be, for example, approximately 24 hours or another suitable period.

The reinforcement module 448 may set the rank of the driver to a fifth rank that is higher than the fourth rank when the rank period is between the fourth predetermined rank period and a fifth predetermined rank period. The fifth predetermined rank period is greater than the fourth predetermined rank period, may be calibratable, and may be, for example, approximately 72 hours or another suitable period.

The reinforcement module 448 may set the rank of the driver to a sixth rank that is higher than the fifth rank when the rank period is between the fifth predetermined rank period and a sixth predetermined rank period. The sixth predetermined rank period is greater than the fifth predetermined rank period, may be calibratable, and may be, for example, approximately 120 hours or another suitable period.

The reinforcement module 448 may set the rank of the driver to a seventh rank that is higher than the sixth rank when the rank period is between the sixth predetermined rank period and a seventh predetermined rank period. The seventh predetermined rank period is greater than the sixth predetermined rank period, may be calibratable, and may be, for example, approximately 168 hours or another suitable period.

The reinforcement module 448 may set the rank of the driver to an eighth rank that is higher than the seventh rank when the rank period is between the seventh predetermined rank period and an eighth predetermined rank period. The eighth predetermined rank period is greater than the seventh predetermined rank period, may be calibratable, and may be, for example, approximately 250 hours or another suitable period.

The reinforcement module 448 may set the rank of the driver to a ninth rank that is higher than the eighth rank when the rank period is between the eighth predetermined rank period and a ninth predetermined rank period. The ninth predetermined rank period is greater than the eighth predetermined rank period, may be calibratable, and may be, for example, approximately 350 hours or another suitable period.

The reinforcement module 448 may set the rank of the driver to a tenth rank that is higher than the ninth rank when the rank period is between the ninth predetermined rank period and a tenth predetermined rank period. The tenth predetermined rank period is greater than the ninth predetermined rank period, may be calibratable, and may be, for example, approximately 500 hours or another suitable period.

Figure 6:
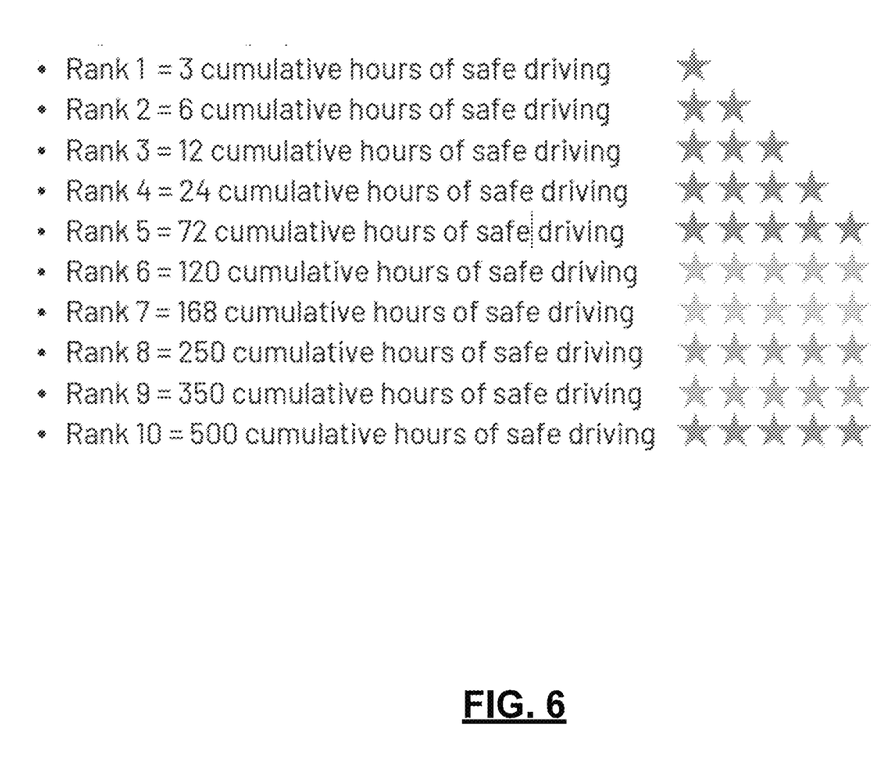
FIG. 6 is an example illustration of driver ranks, predetermined rank periods, and badges.

While the example of ten ranks and predetermined rank periods is provided, the present application is also applicable to additional and other ranks and predetermined rank periods. FIG. 6 includes an illustration of example ranks, rank periods, and rank badges. In the example of FIG. 6, the rank badges are stars of different numbers and/or colors to distinguish between ranks. While example rank badges are provided, the present application is also applicable to other types of badges.

The alert module 452 displays the rank of the driver, such as at least one of via the HUD system, on the duster 362, and on the display 366. The rank is a visual positive reinforcement of good driving. When the rank of the driver increases (e.g., from the first rank to the second rank, etc.), the alert module 452 outputs one or more positive reinforcements of increasing rank, such as visibly (e.g., at least one of via the HUD system, on the duster 362, and on the display 366), audibly via one or more speakers. Visually, for example, the alert module 452 may visually display one or more predetermined graphics and change the present rank to the next higher level. Audibly, for example, the alert module 452 may output a predetermined audible alert (e.g., tone, sound, etc.) indicative of increasing to the next higher level.

Figure 7:
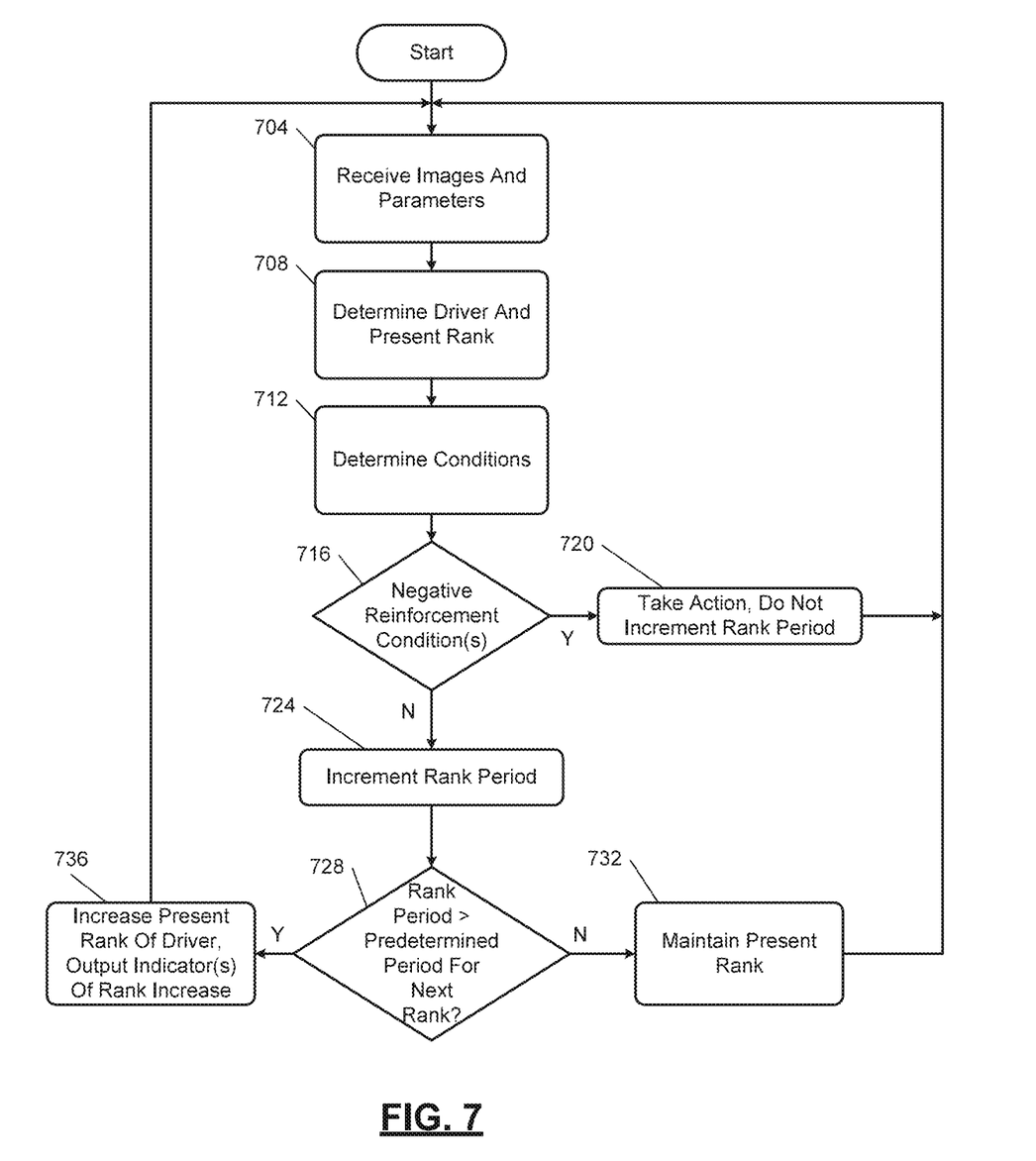
FIG. 7 is a flowchart depicting an example of providing reinforcement for drivers.

FIG. 7 is a flowchart depicting an example of providing reinforcement. Control may begin when the vehicle (e.g., ignition system) is turned on. At 704 images are captured by the cameras 132 and 304 and received. Parameters measured by sensors of the vehicle 100 are also received at 704.

At 708, the driver module 402 determines the driver based on matching the face of the driver captured in an image from the camera 132 with a stored face in a driver profile. The driver module 402 also determines a present rank of the driver from the driver profile. The reinforcement module 448 visually outputs the present rank, such as discussed above.

At 712, the modules detect the conditions inside of the passenger cabin and in front of the vehicle 100, as discussed above. More specifically, the seatbelt module 404 determines whether the driver is property wearing a seatbelt, the DMS module 412 determines whether the gaze of the driver is within the DMS area, the aggressive driving module 436 determines whether aggressive driving is occurring, the lane change module 414 determines whether a lane change without proper turn signal use has occurred, the following module 420 determines whether the following distance is less than the predetermined distance, and the over limit module 428 determines whether the present vehicle speed is greater than the speed limit at the location of the vehicle 100. One or more other modules may additionally or alternatively determine whether one or more other conditions for providing negative reinforcement are present.

At 716, the reinforcement module 448 determines whether one or more conditions for providing negative reinforcement are present as discussed above. If 716 is true, the reinforcement module 448 takes one or more actions to provide negative reinforcement at 720. The reinforcement module 448 also does not increase (e.g., increment) the rank period of the driver at 720. Control returns to 704. If 716 is false, control continues with 724.

At 724, the reinforcement module 448 increases (e.g., increments) the rank period of the driver. At 728, the reinforcement module 448 determines whether the rank period of the driver is greater than the predetermined rank period of the next higher rank. For example, if the driver has the first rank, the reinforcement module 448 may determine whether the rank period is greater than the second predetermined rank period to transition to the second rank. If 728 is false, the reinforcement module 448 maintains the present rank of the driver at 732, and control returns to 704. If 728 is true, the reinforcement module 448 increases the rank of the driver to the next higher rank (e.g., increment the rank by 1) at 736. The reinforcement module 448 also prompts the alert module 452 to output one or more positive reinforcements regarding the increase in the rank. Control returns to 704.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit" The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Per, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A behavior reinforcement system of a vehicle, comprising:
    a first camera configured to capture first images of a driver on a driver's seat within a passenger cabin of the vehicle;
    a second camera configured to capture second images in front of the vehicle;
    a driver module configured to identify a driver of the vehicle based on at least one of the first images and to determine a present rank of the driver;
    a module configured to detect a negative reinforcement condition based on at least one of (a) a first image from the first camera, (b) a second image from the second camera, and (c) a parameter measured by a sensor of the vehicle;
    a reinforcement module configured to:
    display the present rank of the driver within the passenger cabin;
    generate at least one of an audible, visual, and haptic output within the passenger cabin in response to the detection of the negative reinforcement condition;
    when no negative reinforcement conditions are detected, increment a rank period of the driver;
    increase the present rank of the driver when the rank period is greater than a predetermined period; and
    generate at least one of an audible alert and a visual alert within the passenger cabin in response to the increasing of the present rank.

2. The behavior reinforcement system of claim 1 wherein the negative reinforcement condition includes the driver not wearing a seatbelt properly.

3. The behavior reinforcement system of claim 2 further comprising a propulsion control module configured to one of shift a transmission to park and to maintain a transmission in park in response to the module detecting that the driver is not wearing the seatbelt property.

4. The behavior reinforcement system of claim 2 wherein the module is configured to determine whether the driver is property wearing the seatbelt based on input from a seatbelt sensor of the vehicle and a first image from the first camera.

5. The behavior reinforcement system of claim 1 wherein the negative reinforcement condition includes a gaze of the driver not being within a predetermined area.

6. The behavior reinforcement system of claim 5 wherein the module is configured to determine whether the gaze of the driver is within the predetermine area based on a first image from the first camera.

7. The behavior reinforcement system of claim 1 wherein the negative reinforcement condition is aggressive driving.

8. The behavior reinforcement system of claim 7 wherein the module is configured to determine whether aggressive driving is occurring based on at least one of (a) a brake pedal position measured by a brake pedal position sensor and (b) an acceleration of the vehicle measured by an acceleration sensor.

9. The behavior reinforcement system of claim 1 wherein the negative reinforcement condition is changing a present lane of the vehicle without using a turn signal property.

10. The behavior reinforcement system of claim 9 wherein the module is configured to determine whether the changing of the present lane of the vehicle without using a turn signal property occurred based on the second image from the second camera and a turn signal from a turn signal sensor of the vehicle.

11. The behavior reinforcement system of claim 1 wherein the negative reinforcement condition is a distance between the vehicle and an object in front of the vehicle being less than a predetermined distance.

12. The behavior reinforcement system of claim 11 wherein the module is configured to determine the distance between the vehicle and the object based on a second image from the second camera.

13. The behavior reinforcement system of claim 11 wherein the module is configured to set the predetermined distance based on a present speed of the vehicle.

14. The behavior reinforcement system of claim 13 wherein the module is configured to increase the predetermined distance as the present speed of the vehicle increases.

15. The behavior reinforcement system of claim 1 wherein the negative reinforcement condition is a present speed of the vehicle being greater than a speed limit of a road at a present location of the vehicle.

16. The behavior reinforcement system of claim 15 wherein the module is configured to determine the speed limit of the road at the present location of the vehicle based on a second image from the second camera.

17. The behavior reinforcement system of claim 1 wherein the reinforcement module is configured to display a badge associated with the present rank of the driver within the passenger cabin.

18. The behavior reinforcement system of claim 1 wherein the reinforcement module is configured to display the present rank of the driver via at least one of (a) a heads up display system of the vehicle and (b) a display visible within the passenger cabin of the vehicle.

19. The behavior reinforcement system of claim 1 wherein the reinforcement module is configured to increment the present rank of the driver by one when the rank period is greater than the predetermined period.

20. A behavior reinforcement method for a vehicle, comprising:
   using a first camera, capturing first images of a driver on a driver's seat within a passenger cabin of the vehicle;
   using a second camera, capturing second images in front of the vehicle;
   identifying a driver of the vehicle based on at least one of the first images and to determine a present rank of the driver;
   detecting a negative reinforcement condition based on at least one of (a) a first image from the first camera, (b) a second image from the second camera, and (c) a parameter measured by a sensor of the vehicle;
   displaying the present rank of the driver within the passenger cabin;
   generating at least one of an audible, visual, and haptic output within the passenger cabin in response to the detection of the negative reinforcement condition;
   when no negative reinforcement conditions are detected, incrementing a rank period of the driver;
   increasing the present rank of the driver when the rank period is greater than a predetermined period; and
   generating at least one of an audible alert and a visual alert within the passenger cabin in response to the increasing of the present rank.

* * * * *